March 5, 1963
P. S. NEWSWANGER
3,079,744
TOBACCO PLANT HARVESTER
Filed June 1, 1960
11 Sheets-Sheet 1
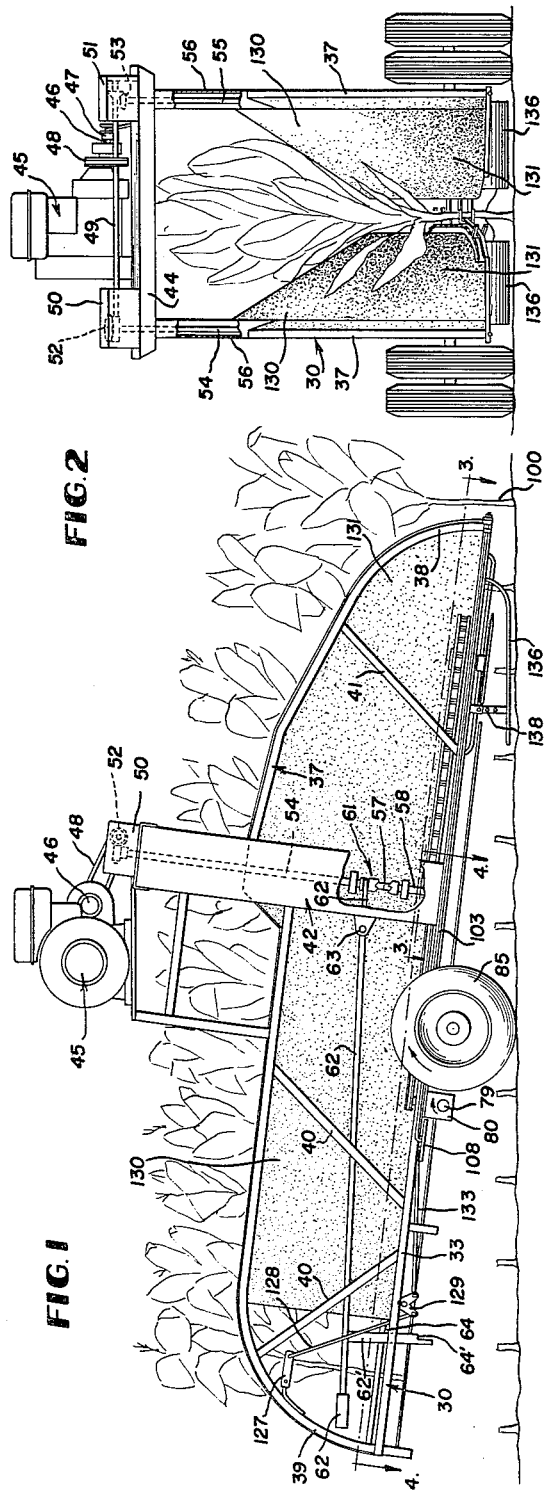
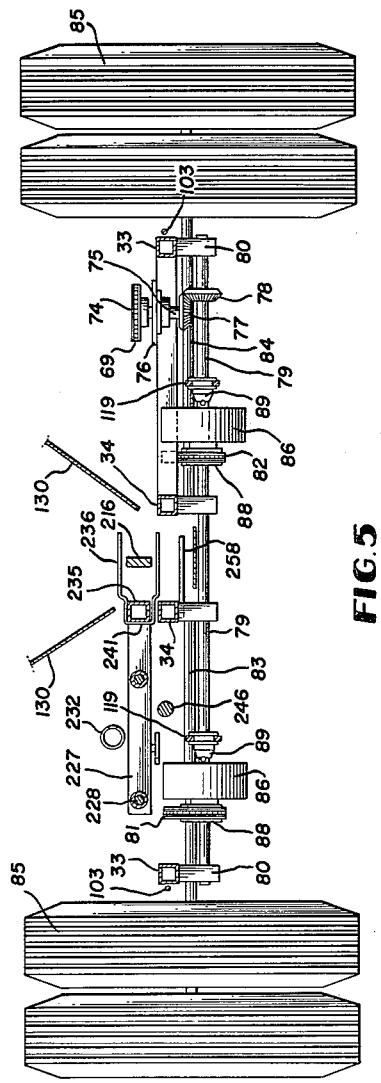
INVENTOR.
PAUL S. NEWSWANGER
BY
B. P. Fishburne Jr.
ATTORNEY

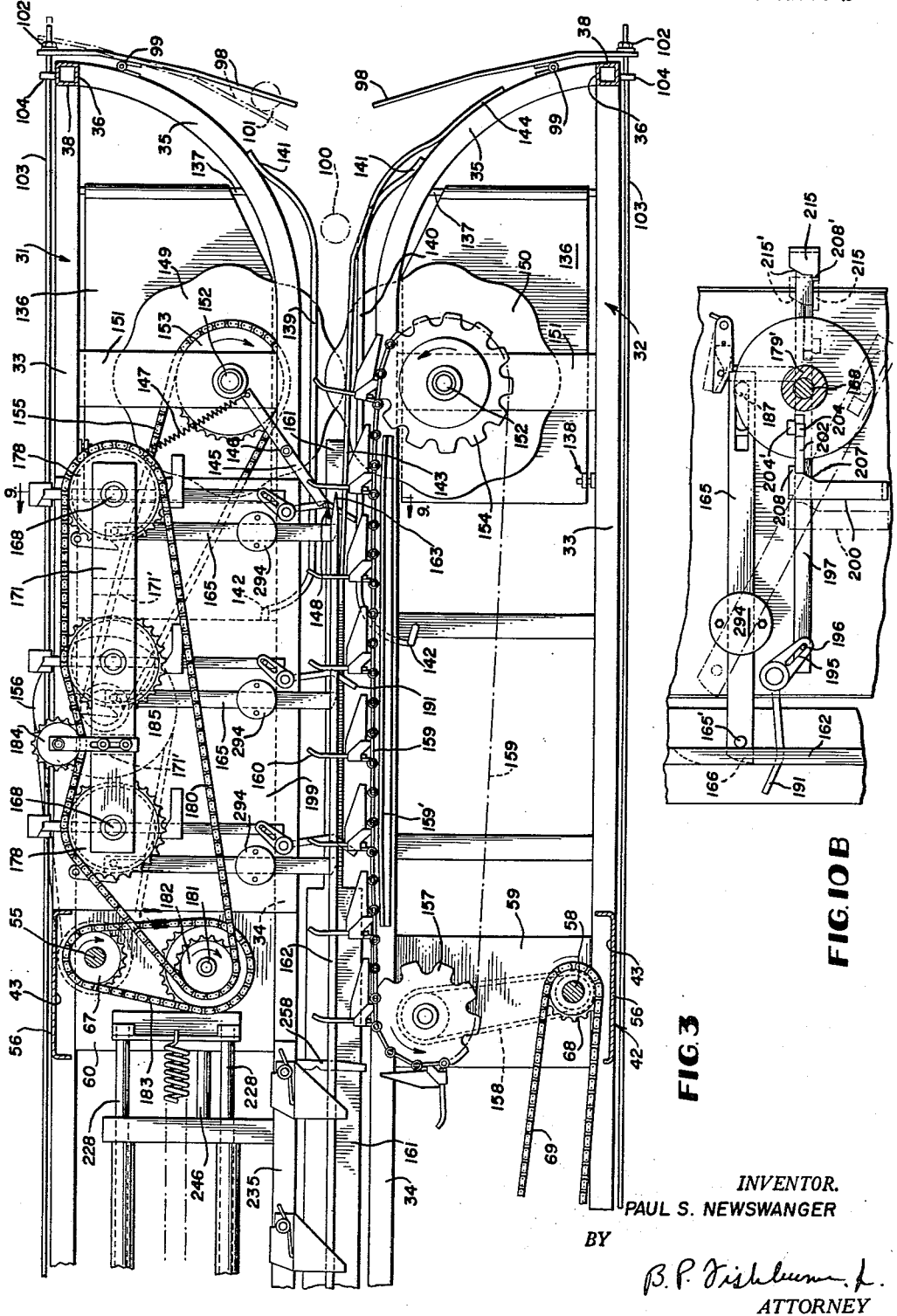

March 5, 1963 P. S. NEWSWANGER 3,079,744
TOBACCO PLANT HARVESTER
Filed June 1, 1960 11 Sheets-Sheet 3

INVENTOR.
PAUL S. NEWSWANGER
BY
ATTORNEY

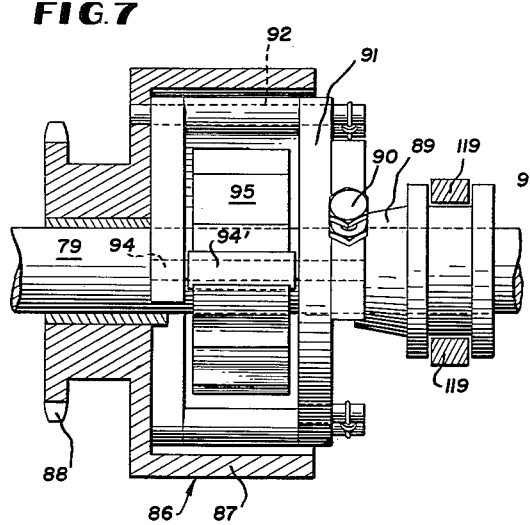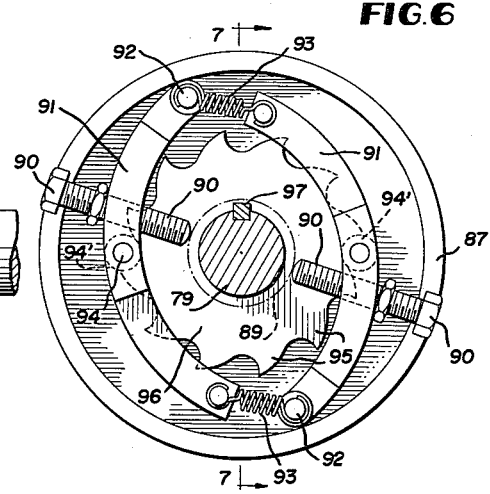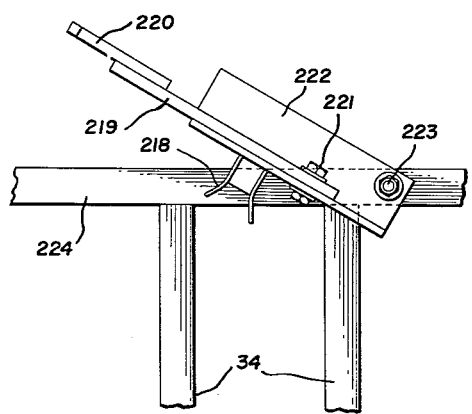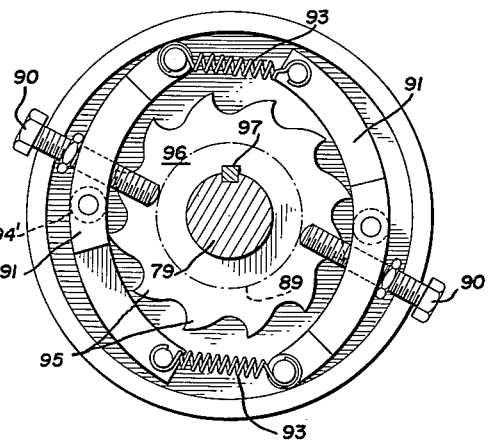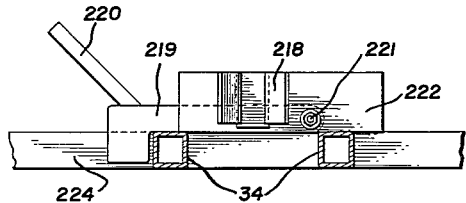

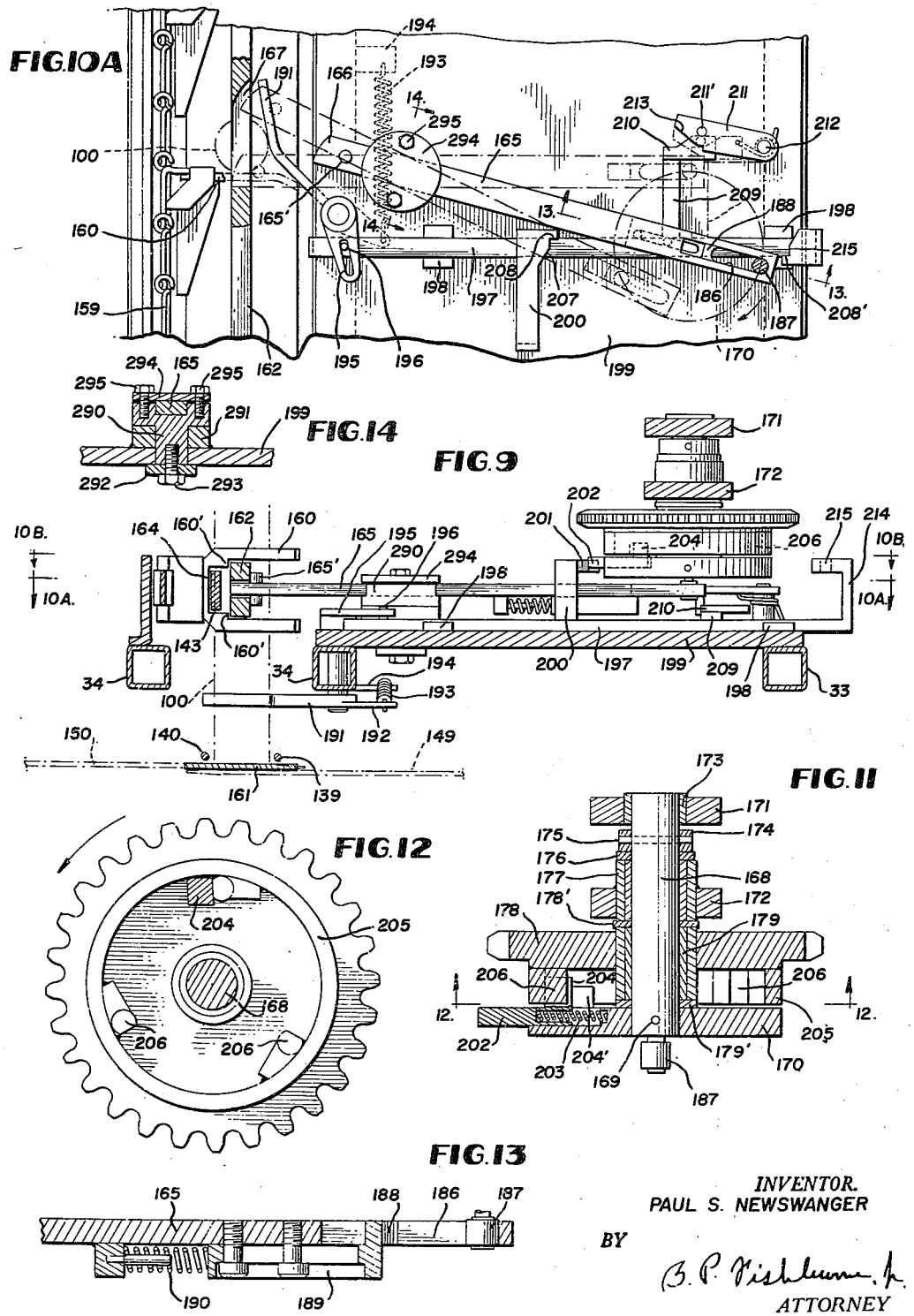

March 5, 1963 — P. S. NEWSWANGER — 3,079,744
TOBACCO PLANT HARVESTER
Filed June 1, 1960 — 11 Sheets-Sheet 6

INVENTOR.
PAUL S. NEWSWANGER
BY
ATTORNEY

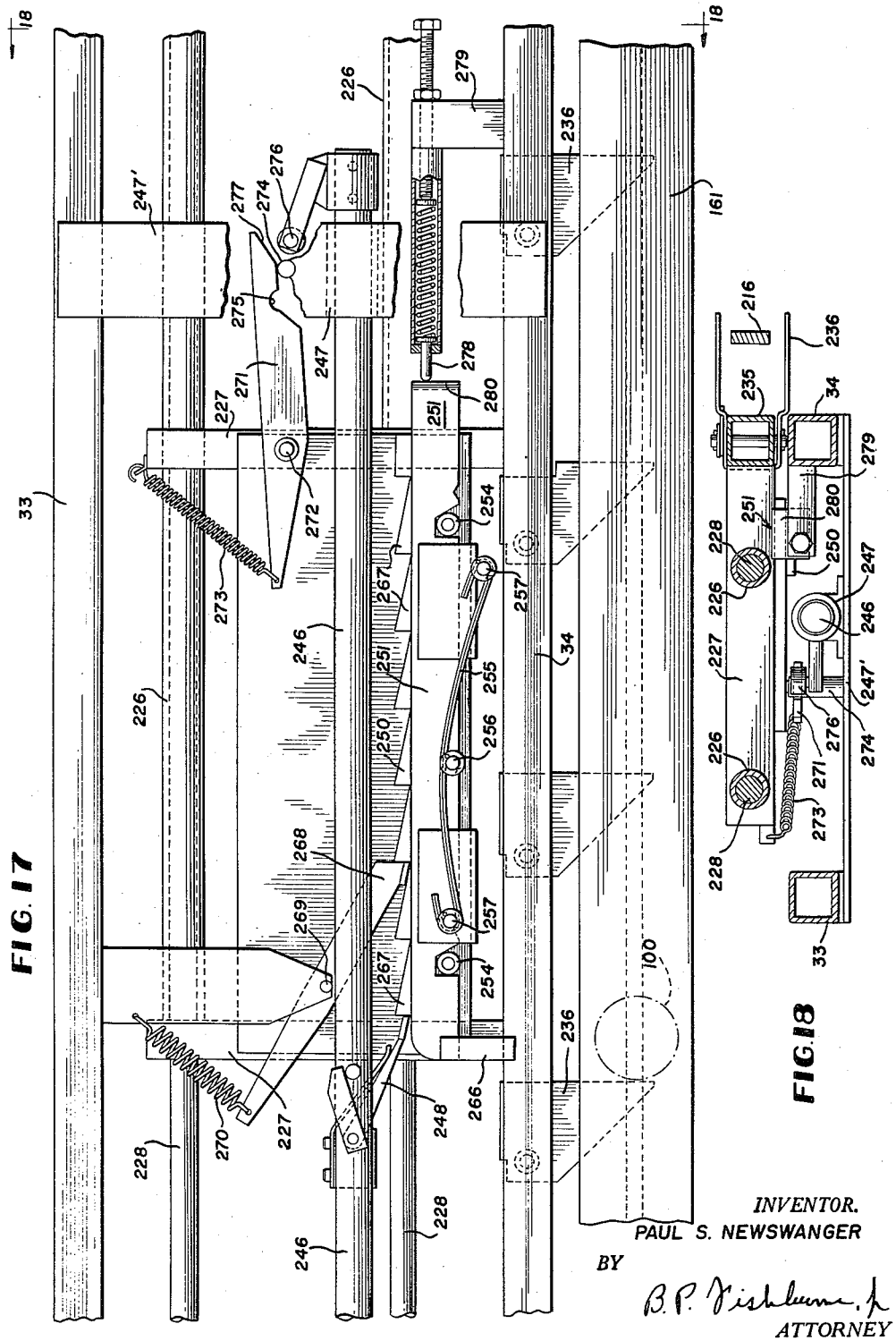

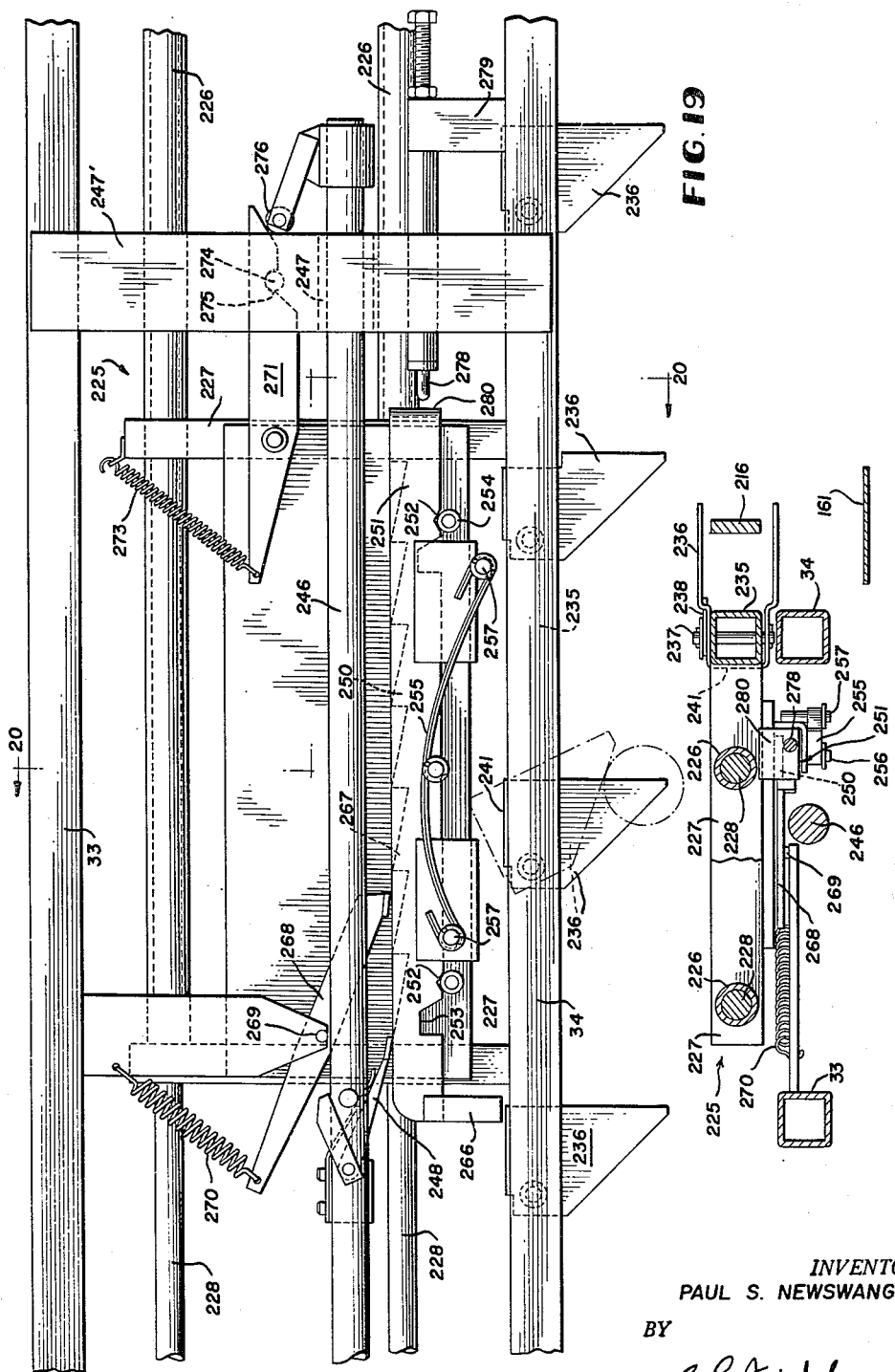

March 5, 1963

P. S. NEWSWANGER 3,079,744

TOBACCO PLANT HARVESTER

Filed June 1, 1960

INVENTOR.
PAUL S. NEWSWANGER

BY

*B. P. Fishburne, Jr.*
ATTORNEY

March 5, 1963
P. S. NEWSWANGER
3,079,744
TOBACCO PLANT HARVESTER
Filed June 1, 1960
11 Sheets-Sheet 11
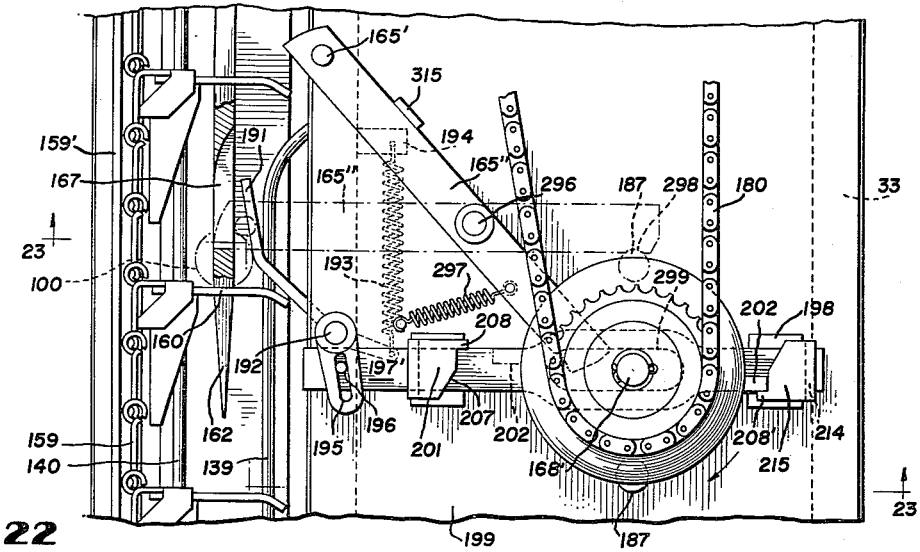
FIG.22
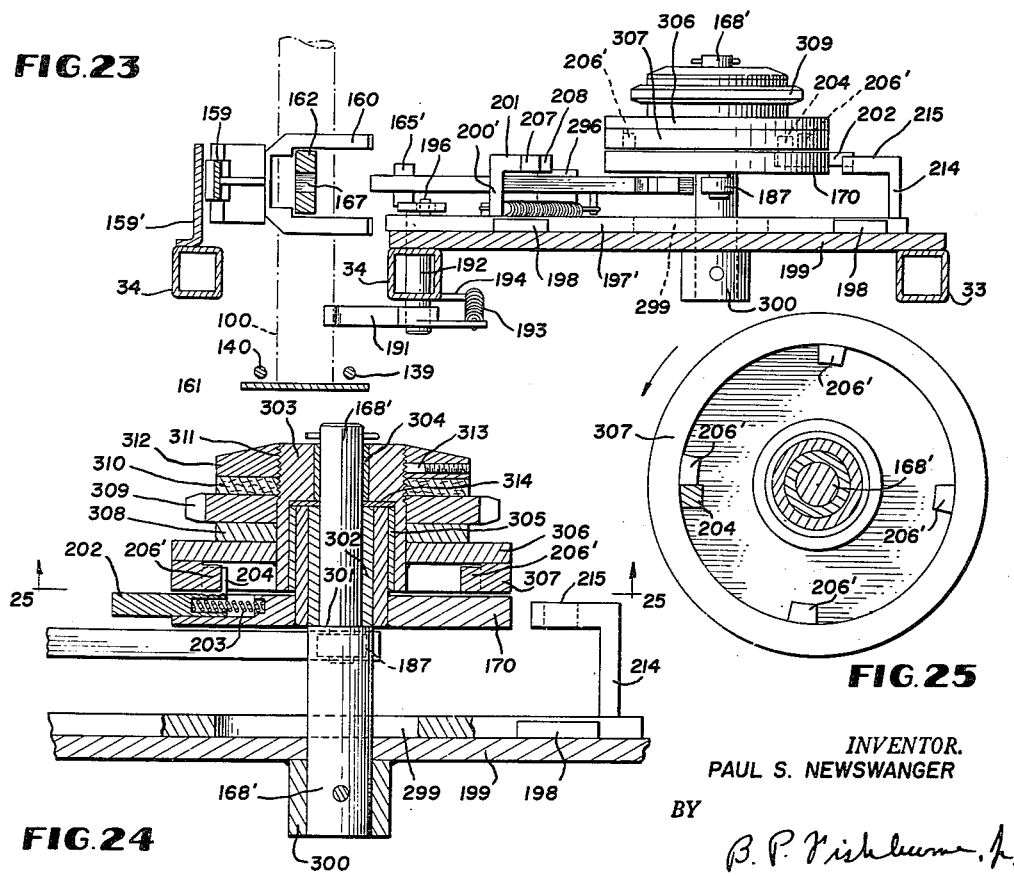
FIG.23
FIG.24
FIG.25
INVENTOR.
PAUL S. NEWSWANGER
BY
ATTORNEY

Patent 3,079,744 — Mar. 5, 1963

3,079,744
TOBACCO PLANT HARVESTER
Paul S. Newswanger, 1608 Oak Lane, Lancaster, Pa.
Filed June 1, 1960, Ser. No. 33,179
18 Claims. (Cl. 56—27.5)

This invention relates to a harvester for tobacco plants and the like.

An object of the invention is to provide a power operated tobacco plant harvester capable of traversing a row of standing tobacco plants and severing the main stalks of the plants in the row close to the ground and impaling the severed stalks upon a spear while the stalks are upright and then shifting the stalks rearwardly upon the spear and finally transferring the stalks from the spear to a storage lath held in alignment with the spear rearwardly thereof, so that the lath containing a plurality of spaced tobacco plants may be bodily removed from the harvester for storage.

Another object of the invention is to provide a tobacco harvester of the above mentioned character which may be manipulated and controlled by a single operator and having novel means engageable with the stalks of standing tobacco plants for steering the harvester along the row of plants.

Another object is to provide a tobacco harvester in which a single prime mover powers the driving wheels of the harvester and also powers the other driven components of the harvester.

Another object of the invention is to provide, in a harvester of the above mentioned character, novel and automatically operable means to retract spear supporting elements from the spear at spaced intervals along the spear to permit passage of impaled stalks along the spear and to subsequently reengage the supporting elements with the spear when the stalks have passed each supporting element.

Another object is to provide in a tobacco harvester of the mentioned type a novel and automatically operable step-by-step feed means for transferring impaled tobacco plant stalks from the spear to the supporting lath in uniformly spaced relation upon the lath, regardless of the spacing of the plants in the row or the spacing of the stalks on the spear.

Further and more general objects are to provide a tobacco harvester for rapidly and efficiently harvesting tobacco plants without damaging the tobacco leaves and which harvester is relatively simplified in construction and operation, relatively economical to manufacture, and rugged and durable.

Other objects and advantages of the invention will become apparent during the course of the following description.

In the accompanying drawings, forming part of this application, and in which like numerals are employed to designate like parts throughout the same:

FIG. 1 is a side elevation of a tobacco harvester according to the invention, partly diagrammatic;

FIG. 2 is a front elevation of the harvester shown in FIG. 1;

FIG. 3 is an enlarged fragmentary plan view of the harvester showing the forward portion thereof, and taken substantially along line 3—3 of FIG. 1;

FIG. 5 is a transverse vertical section, taken substantially on line 5—5 of FIG. 4, with parts omitted;

FIG. 6 is an enlarged end elevational view of one of the main clutches, partly in section and taken substantially on line 6—6 of FIG. 4, and showing the clutch in the engaged position;

FIG. 7 is a transverse vertical section through the main clutch taken substantially on line 7—7 of FIG. 6;

FIG. 8 is an end elevation of the clutch, shown in FIG. 6, in the inactive condition;

FIG. 9 is an enlarged transverse vertical section taken substantially on line 9—9 of FIG. 3;

FIG. 10A is a horizontal section taken on line 10A—10A of FIG. 9;

FIG. 10B is a horizontal section taken substantially on line 10B—10B of FIG. 9, and particularly showing the support bar in the engaged and retracted locked positions;

FIG. 11 is an enlarged fragmentary vertical section through a sprocket wheel and associated elements of one retractible spear supporting unit taken substantially on line 9—9 of FIG. 3;

FIG. 12 is a horizontal cross-section taken on line 12—12 of FIG. 11;

FIG. 13 is an enlarged fragmentary vertical section taken on line 13—13 of FIG. 10A;

FIG. 14 is a similar view taken on line 14—14 of FIG. 10A;

FIG. 17 is a similar bottom plan view of the step-by-step feed means showing the latter near the rearward end of its travel;

FIG. 18 is a transverse vertical section taken on line 18—18 of FIG. 17;

FIG. 19 is a similar bottom plan view showing the step-by-step feed means at the rear end of its travel, just prior to being returned automatically to its initial forward position;

FIG. 20 is a similar section taken on line 20—20 of FIG. 19;

FIG. 22 is an enlarged fragmentary plan view, partly in section of the modified means for supporting the spear as shown in FIG. 21;

FIG. 23 is a transverse vertical section taken on line 23—23 of FIG. 22;

FIG. 24 is a fragmentary central vertical section on an enlarged scale taken substantially on line 24—24 of FIG. 21 through the rotary mechanism forming a part of one retractible spear supporting unit in accordance with the modification;

FIG. 25 is a horizontal section taken on line 25—25 of FIG. 24;

FIG. 26 is an enlarged fragmentary transverse vertical section taken on line 26—26 of FIG. 4; and FIG. 27 is a plan view of the elements shown in FIG. 26 when shifted to a position for releasing the rear end of the lath.

Figure 4:
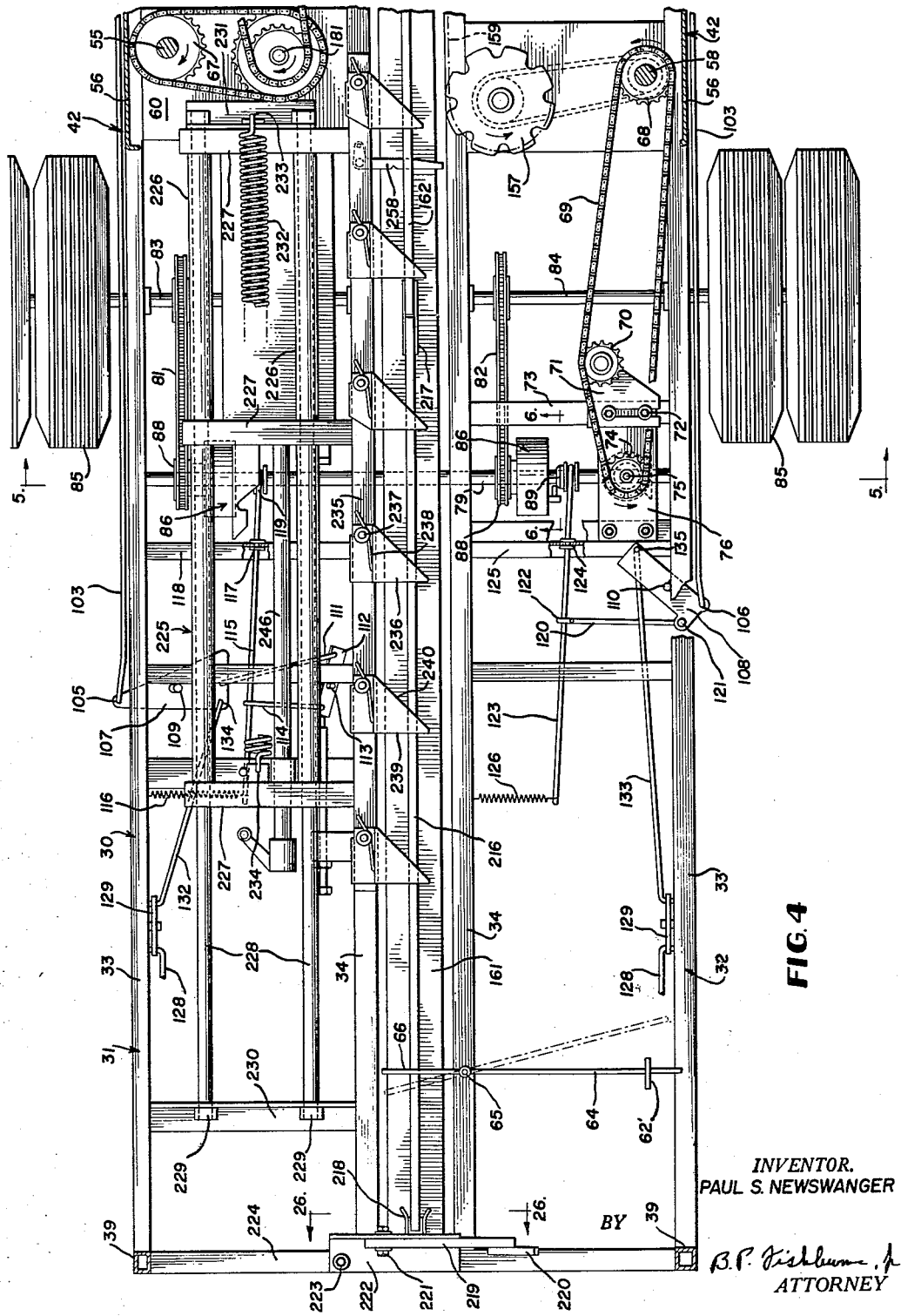
FIG. 4 is a similar view constituting a continuation of the plan view shown in FIG. 3, and showing the rear portion of the harvester, the view taken substantially along line 4—4 of FIG. 1.

In the drawings, wherein for the purpose of illustration are shown preferred embodiments of the invention, attention is directed to FIGS. 1–20 and 26 and 27, illustrating a preferred form of the invention. In these figures, the numeral 30 designates generally the main frame of the harvester, which frame comprises spaced parallel elongated frame sections 31 and 32 which are substantially horizontal during the operation of the harvester. Each frame section 31 and 32 comprises an outer bottom longitudinal frame bar 33 extending for the entire length of the harvester, and an inner longitudinal frame bar 34 substantially coextensive with the frame bar 33, but including a forward outwardly directed curved portion 35, integral therewith, and rigidly secured by welding or the like at 36 to the adjacent frame bar 33. The inner frame bars 34 at the bottom of the frame 30 are spaced apart laterally and are parallel as shown in FIGS. 3 and 4.

Each frame section 31 and 32 comprises an outer upstanding frame side 37, FIG. 1, including forward and rear downturned ends 38, 39, having their lower ends rigidly secured to the frame bars 33. Diagonal braces 40 and 41 serve to further rigidly interconnect the upstanding frame sides 37 with the lower frame sections 31 and 32. In effect, each frame section or side 31 and 32 is L-shaped, as viewed from its end with the upstanding frame sides 37 disposed outermost.

An inverted U-shaped upstanding frame 42 has its lower ends rigidly mounted upon the lower frame bars 33 as indicated at 43 in FIG. 3, and the upstanding frame 42 includes a top horizontal transverse platform 44, rigidly supporting a suitable engine or prime mover 45. The engine 45 has an output shaft 46 including a conventional manually operable clutch means 47 to disconnect the engine shaft from the driven components of the harvester at starting, so that the engine will be under no load at this time. The output shaft 46 of the engine is connected through suitable gearing 48 with a transverse horizontal driven shaft 49, journaled near its opposite ends for rotation on gear boxes 50 and 51 containing a worm gear drive 52 and a right-angle bevel gear drive 53, respectively, operated by the shaft 49. Depending vertical driven shafts 54 and 55 extend downwardly from the gear boxes 50 and 51 and are journaled for rotation near the vertical leg portions 56 of the upstanding frame 42.

With reference to FIG. 1, the vertical driven shaft 54 is formed in two sections, separated at 57 and the lowermost section 58 of vertical shaft 54 is journaled for rotation near the bottom of the harvester upon a transverse horizontal plane 59 constituting the top of a gear box, rigidly connected with the adjacent frame bars 33 and 34, FIG. 3.

The vertical shaft 55 extends from the gear box 51 to the bottom of the main frame and has its lower end journaled for rotation upon a horizontal plane 60, rigidly connected between the frame bars 33 and 34 of frame section 31.

A conventional shiftable clutch device 61, FIG. 1, interconnects the shaft sections 54 and 58 and is operable by means of a long rearwardly extending handle 62, pivoted at 63 to the upstanding frame 42. When the rear end of the handle 62 is lowered, as in FIG. 1, clutch device 61 is inactive and no power is transmitted from the shaft 54 to the shaft section 58. When the rear end of the handle 62 is elevated coacting clutch members coupled to the shafts 54 and 58 are engaged and the clutch device 61 is rendered active for imparting power to the ground-engaging drive wheels, to be described, and to other driven components of the harvester. A horizontally swingable transverse rod 64 near and forwardly of the rear end of the main frame, FIGS. 1 and 4, is engageable at 64' beneath the lower end of depending handle extension 62' to maintain handle 62 elevated, so that the clutch device 61 can be held in the active position without the operator constantly applying upward force to the handle 62. In FIG. 1 the handle 62 is shown in a position to render the clutch device 61 inactive, while in FIG. 4 the depending handle extension 62' is shown engaged with the swingable transverse rod 64 to maintain the handle 62 in an elevated position so as to render the clutch device 61 active. The rod 64 is pivoted at 65 to the frame bar 34 and has an inwardly projecting extension 66, for a purpose to be described.

With reference to FIGS. 3 and 4, the lower ends of shaft 55 and shaft section 58 carry sprocket wheels 67 and 68, respectively. Suitable gearing 69, connected with sprocket wheel 68, extends rearwardly horizontally and engages an idler sprocket 70, carried by a bracket 71, secured adjustably at 72 to a horizontal transverse frame member 73, rigidly secured between the adjacent bars 33 and 34, FIG. 4. The chain or gearing 69 engages another sprocket wheel 74, mounted upon a vertical stub shaft 75, journaled for rotation upon a fixed horizontal frame member 76. The lower end of shaft 75 carries a beveled gear 77, meshing with a beveled gear 78, fixedly secured to a long horizontal transverse shaft 79, having its ends journaled for rotation upon fixed bearings 80, dependingly rigidly secured to the frame bars 33, FIG. 5.

Suitable gearing 81 and 82 interconnects the clutch sprockets 88, to be described, on shaft 79 with forwardly spaced transverse horizontal axle sections 83 and 84, journaled for rotation upon the frame bars 33 and 34 of the respective frame sections and carrying ground-engaging pneumatic tired wheels 85, outwardly of the frame sides of the harvester and near the longitudinal center of the same, FIG. 1. The wheels 85 are rigid with the axle sections 83 and 84 to turn therewith under influence of the gearing 81 and 82, selectively driven by shaft 79.

With reference to FIGS. 5-8, clutches 86 are mounted upon the shaft 79 for controlling the transmission of power from this shaft to the ground-engaging wheels 85, selectively. Each clutch embodies a cylindrical housing 87 including an integral sprocket wheel 88, journaled for rotation upon the shaft 79. Each clutch 86 further embodies a cone-shaped operator 89, slidable axially upon the shaft 79 and having sliding engagement with the inner ends of adjustable radial screws 90 carried by arcuate clutch yokes 91, having corresponding ends pivoted at 92 to the housing 87. Retractile coil springs 93 interconnect the corresponding swingable ends of the yokes 91 with the pivoted ends of the companion yokes, whereby axial movement of the conical operator 89 toward each clutch housing 87 separates the yokes 91 to render the clutch inactive, as shown in FIG. 8. Each yoke 91 is provided near its longitudinal center with an axially extending pin 94 carrying roller member 94' engageable with clutch teeth 95 of a clutch sprocket 96, keyed to shaft 79 for rotation therewith at 97, FIG. 6.

Automatic and manually operable means are provided to operate the clutches 86 to effect steering of the harvester along the row of tobacco plants and compensating for misalignment of individual plants in the row. The automatic means referred to comprises a pair of generally transverse inwardly projecting feeler rods 98, FIG. 3, hinged at 99 to the frame portions 35 and having their inner ends spaced apart for the passage of properly aligned tobacco stalks 100, in the row. Laterally misaligned tobacco stalks 101 will engage one of the feeler rods 98, FIG. 3, to remotely control one of the clutches 86 in order to effect automatic steering of the harvester in the direction of the misaligned stalk 101.

The outer end of each feeler rod 98 is connected at 102 with a longitudinally shiftable horizontal rod 103, slidably supported as at 104 upon the main frame bars 33. The rods 103 extend rearwardly of the wheels 85 and shaft 79 and are pivoted at 105 and 106 to horizontally swingable plates 107 and 108, FIG. 4, in turn pivotally, respectively, at 109 and 110 to the main frame structure.

A link 111 pivoted to the inner end of plate 107 is pivoted to one end of a plate 112, pivoted at 113 to the main frame, and having a reversely extending link 114 pivoted thereto, with its outer end connected to a clutch shifter lever 115 having its rear end connected to a retractile spring 116, secured to a stationary frame part. The lever 115 is pivoted near its forward end at 117 to a fixed frame member 118 and the forward end of the lever 115 is forked at 119, FIG. 7, for shifting engagement with the adjacent conical clutch operator 89.

The spring 116 serves normally to maintain the lever 115 biased, in a direction whereby its forked end 119 will urge the adjacent conical clutch operator 89 to the active position shown in FIGS. 6 and 7, whereby the particular clutch 86 will transmit power to the adjacent ground wheel 85 through gearing 81. When the associated feeler rod 98 contacts an off-center tobacco plant stem 101 the associated rod 103 will be shifted forwardly, and the plate 107 will turn clockwise upon its pivot 109 and the links 111, 112 and 114 will swing the lever 115 in a direction for shifting the associated clutch operator 89 toward the particular clutch 86 to render the same inactive, FIG. 8, and to thus interrupt the flow of power to the associated ground wheel 85, while the opposite wheel 85 continues to be driven. This steers the front end of the harvester toward the off-center plant 101 and allows the same to properly enter the longitudinal guide passage through the harvester.

In like manner, the pivoted plate 108 has a link 120 pivoted thereto at 121, and the inner end of the link 120 is connected at 122 with a horizontally swingable operating lever 123 for the other conical clutch operator 89. The lever 123 is pivoted at 124 to a stationary frame part 125, and the rear end of the lever 123 is biased by retractile spring 126 to a position normally rendering the conical operator 89 of the associated clutch 86 active, as shown in FIG. 6, so that power will be transmitted normally to the associated wheel 85 through gearing 82.

When the associated feeler rod 98 contacts an off-center stalk 101, as previously described, the rod 103 shifts forwardly and the plate 108, FIG. 4, turns counterclockwise and the link 120 swings the lever 123 in a direction to shift the conical operator 89 of the associated clutch 86 to the inactive position, FIG. 8, so that power to the associated drive wheel 85 is interrupted and the desired steering of the harvester in the direction of the misaligned tobacco plant is automatically obtained.

The means to manually control the clutches 86 from the rear of the harvester comprises handles 127 swingably mounted upon the rear frame members 39, FIG. 1, and having depending links 128 pivoted thereto. The lower ends of the links 128 are in turn pivoted to bell cranks 129, pivotally secured to the main frame and having forwardly extending horizontal links 132 and 133 respectively pivoted thereto, FIG. 4. Link 132 is pivoted at 134 to the plate 107, and the link 133 is pivoted at 135 to the plate 108. It may now be readily seen that the operator at the rear of the harvester need only grasp either of the handles 127 and swing the same upwardly toward the frame bar 39 to thereby shift either of the plates 107 or 108 in the proper direction to render the associated clutch 86 inactive, in the same manner as previously described in connection with the automatic steering means including the feeler rods 98 and associated linkages. Thus, steering may be effected automatically in the manner described or at the will of the operator when this is deemed desirable.

Rigidly secured to the forward portion of the main frame 30 in underlying relation to the frame sections 31 and 32 are a pair of ground-engaging runner plates 136, having forward upturned curved portions, pivotally secured to rod cross-braces 137 connected between the frame bars 33 and 35, FIG. 3. The runner plates 136 are spaced slightly rearwardly of the extreme forward ends of the frame sections 31 and 32 and the runner plates have slightly rearwardly divergent relation with the bottom main frame bars, as shown in FIG. 1. The rear ends of the runner plates 136 are vertically adjustable at 138, and their forward ends may pivot upon the braces 137. The runner plates are spaced apart laterally and they engage the ground upon opposite sides of the tobacco plants as the machine travels along the row of plants. The center of gravity of the harvester is forwardly of the wheels 85, so that the forward end of the harvester normally tends to slide along the ground on the runner plates 136.

A central longitudinal passage for the tobacco plant stems 100 is provided between the spaced lower frame bars 34, so that the tobacco plants may pass rearwardly longitudinally through the harvester in a manner to be described. Spaced longitudinal guide rails 139 and 140 are secured at 141 and 142 to the main frame structure and extend at an elevation beneath the frame bars 34, FIG. 9, to support and guide the lower portions of the tobacco stalks 100 or they enter the harvester, and the rails 139 and 140 are spaced somewhat inwardly of the frame bars 34 to define a guide passage for the stalks 100 just large enough to guide them into the harvester. An additional somewhat resilient guide rail 143 is provided upon one side of the stalk passage defined by the rails 139 and 140 and has its forward end secured at 144 to the curved frame bar 35. The resilient rail 143 diverges somewhat inwardly from the adjacent rail 140 to guide each stalk 100 onto the impaling spear to be described. A guide lever 145 is pivoted at 146 to the top of adjacent frame bar 34 on the opposite side of the stalk passage, and a retractile spring 147 serves to resiliently urge the rear guiding end 148 of the lever 145 diagonally across the passage defined by the rails 139, 140 and 143. The lever portion 148 coacts with the rail 143 to guide each stalk 100 onto the spear to be described.

Adjacent each side of the longitudinal passage defined by the spaced lower frame bars 34 an inclined shield 130 is provided, FIG. 2, extending longitudinally of the harvester to elevate and support the tobacco plant leaves above the passage so that the leaves will not be damaged by the harvester. An inclined shield is provided for each frame section 31 and 32 and is secured by suitable bracing and supporting means to extend from the top rail of the outer upstanding frame side 37 to inner frame bar 34 of the corresponding frame section. Towards the front of the machine each inclined shield is secured to the corresponding downturned frame end 38 and forward outwardly directed curved frame portion 35, such that the forward end of each inclined shield is outwardly flared, as indicated at 131, thus enabling the pair of coacting shields to lift the leaves of each tobacco plant as it enters the central longitudinal passage to prevent the tobacco leaves from becoming damaged during the harvesting process. The inclined shields may also serve to support a great deal of the weight of each tobacco plant as it is conveyed longitudinally of the harvester.

Just rearwardly of the mouth of the longitudinal stalk passage and just rearwardly of the curved frame bars 35 and below the latter, a pair of rotary disc knives 149 and 150 are journaled for rotation upon fixed cross frame members 151, as indicated at 152. The disc knives are spaced directly above the runner plates 136 and the inner sides of the disc knives overlap slightly at the center of the passage between the rails 139 and 140, as shown in FIG. 9, and as also shown in FIG. 3. The disc knives are at substantially the same elevation and have substantial sliding contact at their area of overlapping. The shafts which carry the disc knives 149 and 150 have sprocket wheels 153 and 154 mounted thereon, sprocket wheel 154 being mounted just above the level of the main frame bars 34, while sprocket wheel 153 is mounted just below the level of main frame bars 34. The disc knife 149 is driven in the direction of the arrow by gearing 155 and 156, disposed beneath the frame section 31, FIG. 3, connected with the lower end of vertical shaft 55.

A sprocket wheel 157 is journaled for rotation upon the frame member 59, which constitutes the top plate of a gear box, inwardly of shaft section 58 and driven in the direction of the arrow by suitable gearing 158, disposed in the gear box beneath member 59, from the shaft section 58. A continuous conveyor chain 159 is trained about the sprocket wheels 154 and 157 and the conveyor chain 159 serves to drive the other disc knife 150 in the direction of the arrow in unison with the disc knife 149. The inner side or runner of the conveyor chain 159 is disposed just above the adjacent frame bar 34, near and outwardly of one side of the stalk passage. The conveyor chain 159 carries a plurality of longitudinally equidistantly spaced forked stalk pusher fingers 160, adapted to project transversely across the stalk passage defined by the rails 139, 140, and frame bars 34, and one of these fingers engages each stalk 100 slightly in advance of the overlapping portions of the disc knives and pushes the stalk against the disc knives as the harvester moves forwardly to aid in severing the plant stalk near the ground level.

An elongated bottom plate 161 is secured to the main frame structure in any suitable manner at the elevation of the disc knives 149 and 150 and extends from a point adjacent the disc knives throughout the entire length of the harvester to engage and support the bottom of each upright severed tobacco plant stalk 100, as indicated in FIG. 9, while each stalk is fed rearwardly by the forked fingers 160 of chain 159.

An elongated impaling spear 162 formed of steel or the like is arranged in the longitudinal stalk passage through the harvester at the elevation of the forked pusher fingers 160, FIG. 9. The forward pointed tip 163 of this spear terminates just rearwardly of the rotary disc knives 149 and 150 and adjacent the diagonal guide extension 148 of pivoted guide lever 145 and close to the resilient guide rail 143. Each forked finger 160 receives the spear 162, as indicated in FIG. 9, and the guide rail 143 is also received within inner recesses 164 of the forked fingers supported thereby close to the adjacent side of the spear.

Means are provided to support the spear 162 in the longitudinal stalk passage and such means comprises a plurality of spaced transverse rectractible spear support bars 165 having inner ends 166 adapted for supporting engagement within slots 167 formed through the spear 162 at spaced intervals. As illustrated in FIG. 9 the spear 162 is supported in the vertical plane by the support bars 165 and in the horizontal plane by sliding contact of the shoulder 160′ of each forked finger 160 with one side of the spear and abutment of the centering pins 165′ carried by support bars 165 with the opposite side of the spear. Thus, the support bars 165 are adapted to intermittently support the spear at a plurality of points along its length, and the spear will always be supported by at least two of the bars 165 during the operation of the harvester. The bars 165 are individually retractible from supporting engagement with the spear by means to be described, to permit the passage of the stalks 100 along the spear and beyond the supporting bars 165. The means for actuating the supporting bars 165 is illustrated in FIGS. 3 and 9–14. Such means comprises in conjunction with each supporting bar 165 a short upstanding shaft 168, rigidly secured at its lower end as at 169 to a disc 170. Upper and lower longitudinally extending support bars 171 and 172 are provided adjacent one side of the main frame and somewhat above the frame bar 33 and these support bars are suitably rigidly secured to the main frame structure in position one above the other by means of support members indicated at 171′. The upper end of each shaft 168 is journaled in a bushing 173 within the upper support bar 171, and a thrust collar 174 is pinned to each shaft 168 at 175 to support the shaft. The collar 174 bears upon a thrust bearing 176 disposed between the collar and bushing means 177, rigid with the lower support bar 172. Below the bar 172 a gear 178 is rotatably mounted upon each shaft 168 with bushing means 179 arranged between the gear and shaft 168, thrust bearing 178′ disposed between bushing means 177 and 179, and thrust bearing 179′ disposed between bushing means 179 and disc 170. This latter thrust bearing provides clearance between the gear 178 and disc 170. The gear 178 is freely rotatable upon the shaft 168 and the shaft and disc 170 are turnable relative to the stationary bars 171 and 172. The entire assembly is suspended from the thrust collar 174 and pin 175. Gearing 180 engages each of the gears 178, FIG. 3, and the gearing 180 is driven by an upstanding shaft 181 having a sprocket 182 engaging the sprocket chain of gearing 180. The shaft 181 is journaled upon the frame member 60 and is powered by suitable gearing 183 driven by sprocket wheel 67 from vertical shaft 55. Thus, all of the gears 178 are continuously driven in the direction of the arrows, FIG. 3, and in unison. An idler sprocket 184 is adjustably secured at 185 to the support bar 171, FIG. 3, to keep the flexible chain 180 properly engaged with the gears 178.

With continued reference to the drawings, each retractible spear supporting bar 165 is slotted in its outer end at 186 to receive an eccentric roller 187, dependingly journaled upon the disc 170 near the periphery thereof. A curved abutment 188 constitutes the inner end of the slot 186, and the abutment 188 forms a part of a slide 189 on the lower face of bar 165, FIG. 13, backed up by a compressible coil spring 190 which serves to cushion the engagement of the roller 187 with the abutment 188 during operation. This is a safety feature to prevent stripping of gears or damaging of any part of the mechanism if binding should occur while the disc 170 is rotating.

A trigger element 191 is provided for each spear supporting bar 165 in the path of travel of the stalks 100 moving along the spear. Each trigger element is pivotally mounted at 192, FIG. 9, to the bottom of the adjacent main frame bar 34 and is positioned intermediate the spear 162 and the bottom stalk supporting plate 161. A retractile spring 193 is secured to the trigger 191 and to a fixed element 194 on the main frame, and serves to normally hold the trigger 191 transversely of the spear 162 and in the path of travel of the oncoming stalks 100. The trigger 191 includes a slotted extension 195, positioned above frame bar 34 and integrally movable with trigger 191, slidably receiving a pin element 196, rigid with a transverse reciprocatory slide bar 197 having guided engagement at 198 with a horizontal support plate 199 rigidly mounted upon the main frame bars 33 and 34, FIG. 9. The slide bar 197 has an upstanding C-shaped element 200 rigidly mounted thereon intermediate its ends including a stepped cam extension 201, arranged in the path of travel of a reciprocatory lug 202 carried by disc 170 and urged outwardly by a spring 203. The element 202 carries an upstanding projection 204 interiorly of a depending annular flange 205 on the gear or sprocket 178, and the annular flange includes a plurality of circumferentially equi-distantly spaced fixed abutment elements 206, interiorly thereof. The projection 204 on the lug 202 is adapted to engage any of the abutment elements 206 to positively interconnect the constantly rotating gear 178 with the rotary disc 170 when the lug 202 is in the outwardly urged position as shown in FIG. 11. A back-up block 204′ is carried on the top surface of disc 170 in sliding contact with projection 204 to strengthen or make more rigid the coupling between the projection 204 and abutment elements 206.

When the trigger 191, FIG. 10A, is engaged by the oncoming stalk 100, the trigger swings to the right or clockwise in FIGS. 10A and 10B, and the trigger extension 195 shifts the slide bar 197 inwardly or toward the spear 162. When this occurs, the cam extension 201 is shifted radially away from the lug 202 so that the projection 204 of the latter is positioned by the spring 203 for engagement with one of the abutments 206 of the rotating gear 178. When this engagement takes place, the disc 107 is locked to the gear for rotation therewith and turns with the shaft 168 and gear, and the depending roller 187 in the slot 186 causes the particular spear support bar 165 to be withdrawn or retracted from the slot 167 so that the particular stalk 100 may pass the retracted support bar 165 and be moved further back on the spear by the forked conveyor finger 160. It may be noted in FIG. 10A that the trigger 191 is of such shape and long enough to maintain the slide bar 197 triggered or in the inner position until the stalk 100 passes the slot 167 completely so that the slot is again clear to receive the supporting end 166 of the bar 165.

Since the chain 159 carrying the forked fingers 160 for advancing the stalks along the spear normally rotate only when the clutch 61 is engaged and the machine is moving in a forward direction, and the gearing 180 coupled to shaft 55 is continuously rotating, it would be possible for a support bar 165 to crush a stalk 100 if the forward motion of the machine was stopped, leaving a stalk on the spear in the area of the slot 167, after a support bar 165 had been retracted. The stalk would remain covering the slot 167 since the motion of chain 159 is stopped and the disc 170 controlling the movement of bar 165 would continue to rotate, since gearing 180 is continuously moving, thus moving the support bar back toward the spear slot 167 and crushing the stalk. In order to prevent such an occurrence an upstanding C-shaped extension 214 is provided on the outer end of slide bar 197. The extension 214 has a top cam face 215 corresponding in shape to cam extension 201 to engage the element 202.

As the actuated trigger 191 shifts the slide bar toward the spear 162 the cam face 215 carrier by extension 214 is moved radially into the path of travel of the element 202 on the disc 170, as indicated in phantom in FIG. 10B. Rotation of the disc 170 causes the tip of the element 202 to engage the cam face 215 on its inclined portion 215' and this will shift the element 202 inwardly, thus spring-loading it, and disengaging the upstanding projection 204 from the particular abutment element 206 to immediately arrest rotation of the disc 170 although allowing continued rotation of the gear 178. This manipulation thus retains the supporting bar 165 in the retracted position as shown in phantom in FIG. 10B until the stalk 100 releases the trigger 191.

The cam face 215 has a stop extension 208' to engage the retracted element 202 to arrest rotation of the disc 170 and to prevent override.

When the stalk 100 clears the trigger 191, the spring 193 immediately returns the trigger to its normal position, shown in FIG. 3, and the slide bar 197 is returned outwardly or to the right in FIGS. 10A and 10B so that the cam face 215 is removed from the path of travel of the element 202 and the cam extension 201 is again returned to the path of travel of the element 202 on the disc 170. When this condition prevails the projection 204 of element 202 will again engage with one of the abutments 206 of the rotating gear 178 thus causing the disc 170 to again rotate in unison with gear 178, and continued rotation of the disc 170 will cause the tip of the element 202 to engage the cam part 201 on its beveled portion 207 and this will shift the element 202 inwardly and disengage the upstanding projection 204 from the particular abutment element 206 to immediately arrest rotation of the disc 170 although allowing continued rotation of the gear 178. The cam element 201 has a stop extension 208 to engage the retracted element 202 and arrest rotation of the disc 170. By the time that rotation of the disc 170 is thus arrested, the spear supporting bar 165 will have been re-engaged with the spear slot 167 to again support the spear. The oscillatory movement of each supporting bar 165 is shown in full and broken lines in FIG. 10A, while the engaged and retracted positions of the supporting bar 165 in the locked state are shown in full and broken lines, respectively in FIG. 10B. In full lines in FIG. 10A, the bar 165 is shown fully retracted while in broken lines, the bar is shown partially retracted and in the active or spear supporting position.

A lateral extension 209 on the slide bar 197, FIG. 10A, carries an element 210 having a stepped cam face for coaction with a spring-loaded pivoted element 211 mounted upon the support plate 199 and pivoted thereto at 212. The element 211 has a stepped cam face 213 substantially shaped like the cam elements 201 and 215 and serves to lock the support bar 165 in the spear 162 when the slide bar 197 is in the untriggered position. Pivot element 211 engages the end of support bar 165 in a notch on its cam face 213 and prevents the support bar from becoming dislodged from the spear slot 167 due to vibration of the machine, etc. The sloping cam face 213 engages the end of the spear support bar as it is being re-engaged with the spear slot 167 to prevent override of the support bar 165 as stop extension 208 of cam element 201 simultaneously arrests the override motion of disc 170.

When slide bar 197 moves towards the spear 162 to allow the support bar 165 to be retracted, the cam face of element 210 carried by lateral extension 209 simultaneously moves in the same direction and by coaction with pin 211' carried by the element 211, the element 211 is rotated free of the end of the support bar 165, thus unlocking it and permitting it to be retracted from the spear, as shown in full lines in FIG. 10A. After the stalk clears the trigger 191 the lateral extension 209 carrying the cam face element 210 returns to a position away from the spear as indicated in dotted lines in FIG. 10A, allowing the pivoted element 211 to rotate slightly counterclockwise and again lockingly engage the end portion of the support bar.

The forward portion of the support bar 165 is slidably engaged in a slot in the top face of pivot element 290 mounted for pivotal movement in hub member 291 on horizontal support plate 199 by means of bearing washer 292 and bolt 293. The support bar 165 is maintained in the face slot of pivot element 290 by friction plate 294, adjustably secured to pivot element 290 by means of adjusting bolts 295. Adjusting bolts 295 are tightened just enough to impart sufficient drag on the support bar 165 as it reciprocates in the slot to insure the eccentric roller 187 will travel from one end of slot 186 to the other end as it directs the support bar in its oscillatory path. Thus this assembly acts as a forward guide for the reciprocating support bar and is disposed to pivot with the bar as it traverses its oscillatory path.

The construction and mode of operation of all of the spear supporting bars 165, triggers 191 and associated elements is the same as shown and described in connection with the one unit illustrated in detail in FIGS. 9-14, and it should be understood that as the stalks 100 pass and trip each trigger 191 in the manner shown in FIG. 10A, the associated support bar 165 will be retracted from its slot 167 by the disc 170 and associated elements, and then returned into supporting engagement with the spear after the stalk 100 passes beyond the particular slot 167 under influence of the chain 159 carrying forked fingers 160. The chain 159 in the area in which it assists in supporting the stalks is in sliding contact with back-up plate 159'. This back-up plate member 159' prevents sagging of the chain in the horizontal plane due to the horizontal component of the stalk weight bearing against the chain.

With particular reference to FIGS. 15-20 of the drawings, when each stalk 100 has been impaled upon the spear 162 and pushed rearwardly thereon by a finger 160 and while remaining upright, means are provided to advance each impaled stalk in succession further rearwardly along the spear and onto a supporting lath 216 carried by the rear portion of the harvester in longitudinal alignment with the spear and forming in effect a continuation thereof, see FIG. 4. The forward end of the lath 216 is socketed at 217 in alignment with the spear 162, and the rear end of the lath 216 is socketed at 218 upon a vertically swingable member 219 having a handle extension 220 and pivoted at 221 to a horizontally swingable angle bar 222, pivoted at 223 to the rear frame bar 224 of the main frame. This arrangement facilitates lifting the rear end of the lath 216 and disconnecting it from the socket 218 so that the lath may be bodily removed from the harvester and from the socket 217 after it is filled with the desired number of tobacco plants in the manner to be described, by pulling it rearwardly.

The means for feeding each tobacco plant stalk 100 rearwardly on the spear 162 beyond the region of the chain 159 and onto the lath 216 in uniformly spaced relation comprises, with reference to FIGS. 15–20 and FIG. 4, a longitudinally reciprocatory slide carriage 225, including spaced parallel tubes 226, rigidly connected at their opposite ends and near their longitudinal centers by transverse horizontal cross members 227. The slide carriage 225 is mounted bodily upon a pair of long parallel longitudinal guide bars 228 having their opposite ends rigidly connected at 229 with fixed cross members 230 and 231. A strong longitudinal retractile coil spring 232 has one end fixedly secured at 233 to the cross member 231 and its opposite end secured at 234 to the cross bar 227 of the carriage 225. Thus, the spring 232 serves constantly to urge the entire carriage 225 toward its forwardmost position shown in FIG. 4 and in FIG. 15.

The carriage 225 further embodies an inner side longitudinal bar 235, rigid with the inner ends of the cross bars 227 and extending for the entire length of the carriage. Pivoted upon the bar 235 at longitudinally equidistantly spaced intervals are a plurality of forked generally triangular pusher elements 236, the upper and lower plate portions of which straddle the lath 216, FIGS. 4, 5 and 20. The pusher elements 236 are pivoted at 237 to the bar 235, and springs 238 serve to yieldably hold the pusher elements 236 in the positions shown in FIG. 4, wherein their rear edges 239 are normal to the lath 216 and their forward diagonal edges 240 are positioned as shown. Upon return movement of the carriage 225, the diagonal edges 240 are adapted to trip over the stalks 100 which are impaled on the lath and spear, and each of the elements 236 is turnable clockwise in FIG. 4 against the springs 238 to permit this tripping action upon retrograde movement of the carriage 225. This action is shown in phantom in FIG. 19. Engagement of depending inner flanges 241 on the elements 236 with the inner side of bar 235 prevents the forked elements 236 from swinging in the clockwise direction beyond their positions shown in FIG. 4, wherein the pusher elements are pushed to advance the stalk 100 step-by-step in spaced relation onto and along the lath until the lath contains the desired number of tobacco plants.

Figure 15:
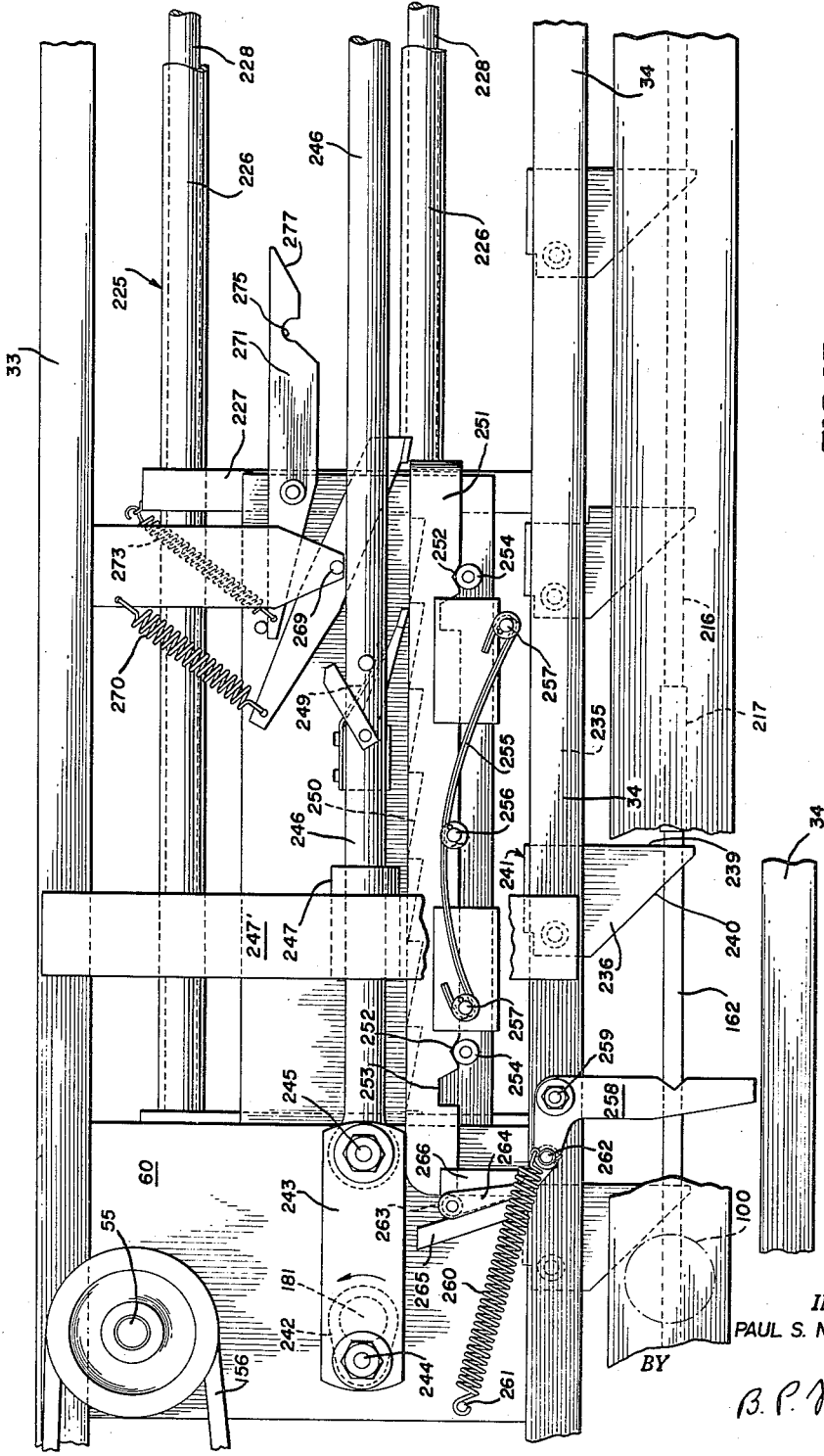
FIG. 15 is an enlarged fragmentary bottom plan view of the step-by-step feed means for transferring the tobacco plants from the spear onto the supporting lath, and being in the initial inactive or untriggered condition.
Figure 16:
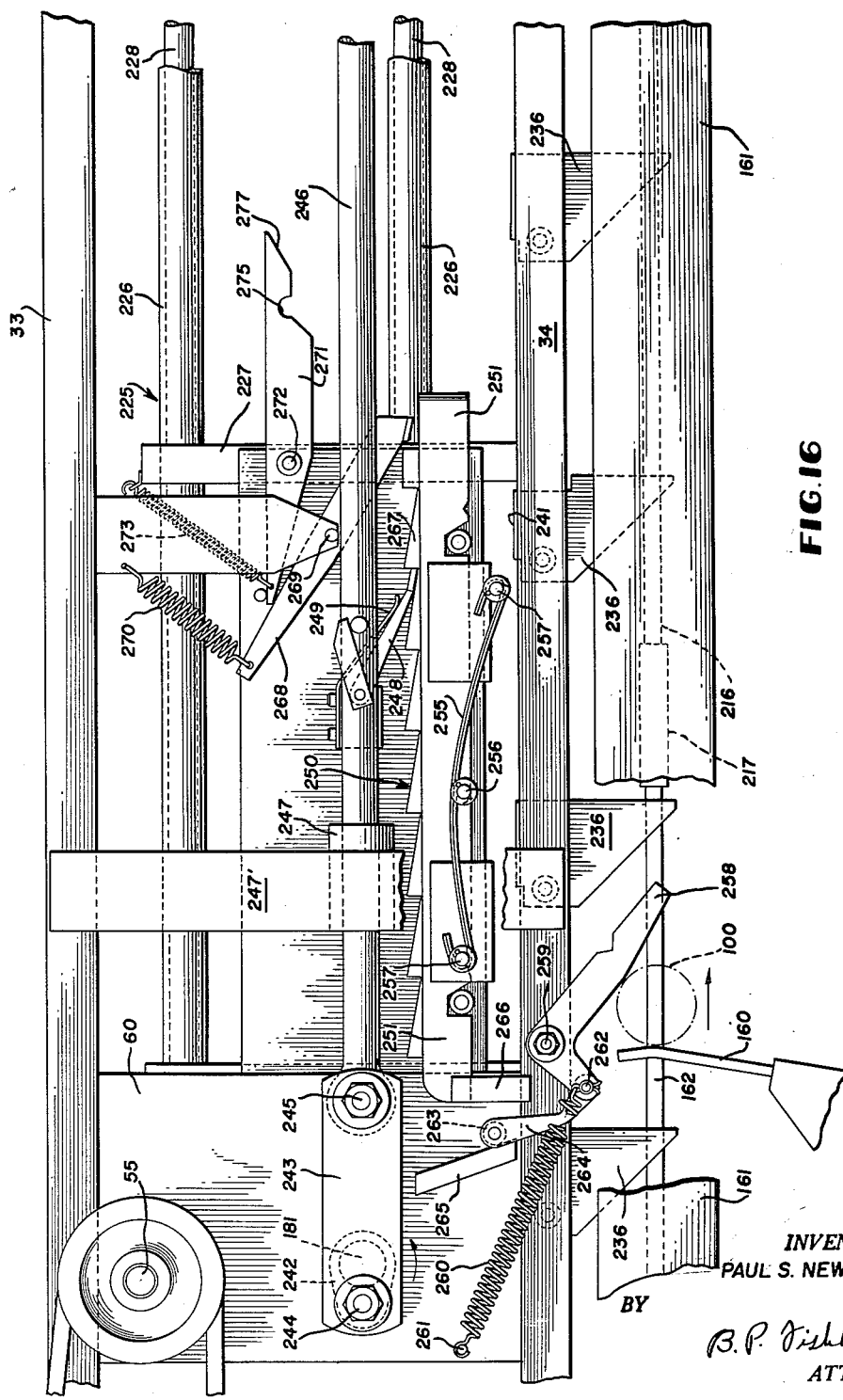
FIG. 16 is a similar bottom plan view showing the step-by-step feed means in a triggered position for effecting the step-by-step feeding of each stalk onto the lath.
Figure 21:
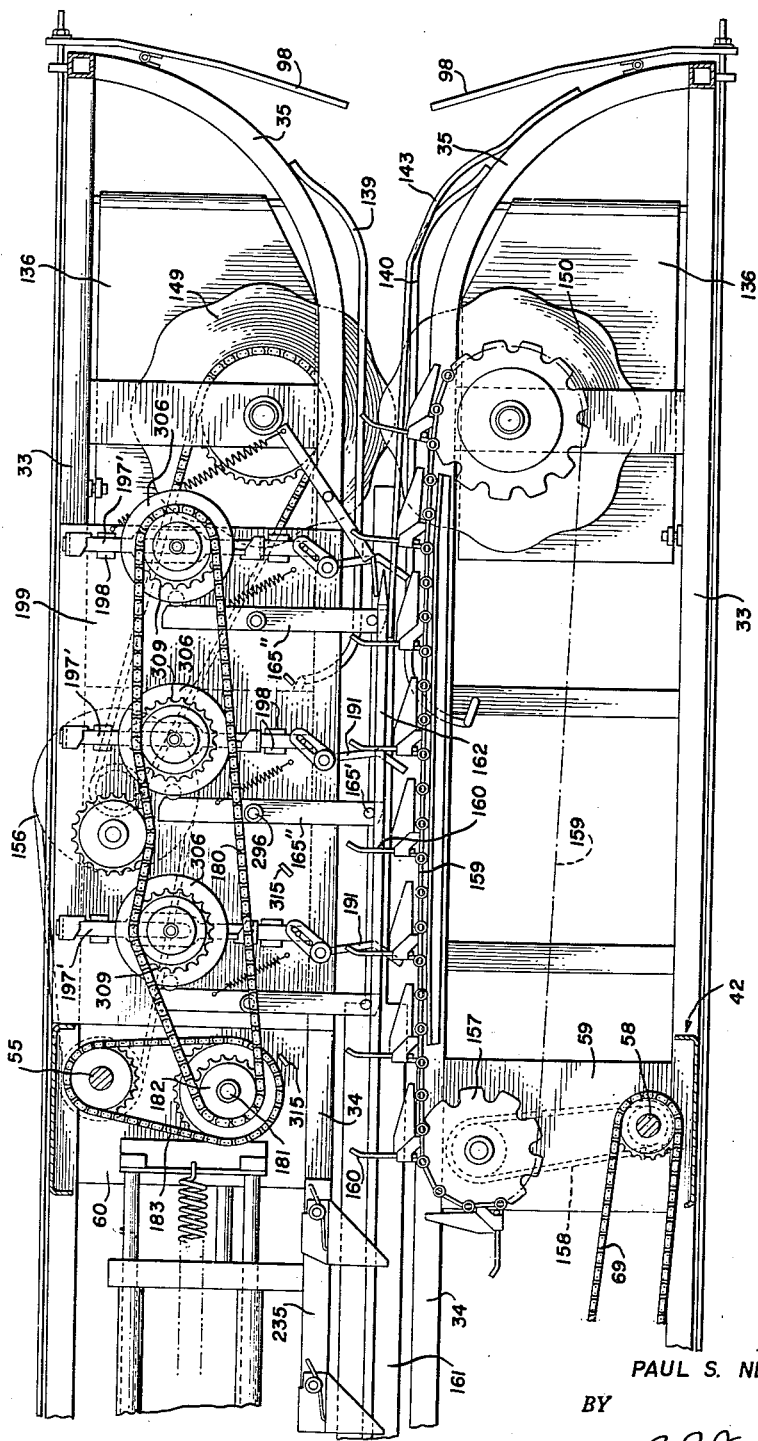
FIG. 21 is a fragmentary top plan view of the forward portion of the harvester and showing a modified form of retractible means for intermittently supporting the spear.

With reference to FIGS. 15–20, the shaft 181 carries an eccentric crank 242 for rotation therewith, below the fixed plate 60, and an oscillatory link 243 is pivoted to the cranks 242 and 244 and also pivoted at 245 to a reciprocatory bar 246 having guided engagement with the cross members 247′ of the frame section 31 at 247. The reciprocatory bar 246 carries a feed pawl 248, spring-loaded at 249 for engagement with a toothed rack bar 250, rigidly secured to the framework of the carriage. A rack bar guard or cover 251 mounted upon the carriage 225 is arranged in close underlying relation to the rack bar 250 and is provided in its inner longitudinal edge with shallow notches 252 and adjacent deep notches 253, as shown. Fixed roller elements 254 on the rack bar 250 are selectively engageable within the notches 252 and 253 to maintain the rack bar guard 251 in covering or uncovering relation to the teeth of the rack bar 250. In FIGS. 15, 19 and 20, the rack bar teeth are covered by the guard 251 and the pawl 248 cannot engage the rack bar teeth and merely slides along the edge of the guard 251 during reciprocation. In FIGS. 16, 17 and 18, the guard 251 is in a position to uncover the teeth of the rack bar so that the pawl 248 may act thereon.

A leaf spring 255 engages a pin element 256 on the guard 251 to normally urge the guard to the retracted or inactive position shown in FIG. 16 for imparting a spring-loaded effect to the bar. The ends of the spring 255 are anchored at 257 to parts rigid with the rack bar. All of these mentioned elements form parts of and move with the carriage 225.

An L-shaped trigger 258 is pivoted at 259 to the bottom of the longitudinal frame bar 34. A retractile spring 260 fixedly anchored at 261 is connected with the trigger 258 at 262 and serves normally to hold the trigger in the position indicated in FIG. 15.

With reference to FIG. 16, when the rearmost forked finger 160 of conveyor chain 159 advances a stalk 100 rearwardly adjacent the sprocket wheel 157, FIGS. 3 and 4, this stalk will engage the trigger 258 and swing the same to the position shown in FIG. 16, whereupon a wedge roller element 263 carried by a link 264 pivoted to the trigger at 262 will engage a fixed inclined abutment 265 and an end lug 266 on the guard 251 and cause the guard to move rearwardly and have its notches 252 disengaged from the rollers 254 and its notches 253 engaged therewith, FIG. 16, to retract the guard and expose the teeth of the rack bar 250 to the action of the continuously reciprocating pawl 248 under influence of the continuously rotating shaft 181.

As the shaft 181 continues to rotate, the reciprocatory pawl 248 upon each stroke of the bar 246 will engage one tooth 267 of the rack bar and shift the carriage rearwardly along the guide bars 228 a distance equal to the spacing of the teeth 267. A locking pawl 268, pivoted at 269 to the main frame structure, is biased by a spring 270 into locking engagement with the teeth 267 to hold the rack bar and carriage 225 in the rearward position caused by the step-by-step action of the pawl 248. As this step-by-step action continues, the entire carriage 225 is shifted further rearwardly against the tension of the spring 232 and the forked pusher elements 236 successively engage each stalk 100 transferred to the region of the trigger 258 by the rearmost forked finger 160 and advance the stalks rearwardly along the lath 216 in equidistantly spaced relation and in a continuous step-by-step manner under influence of the pawl 248 on the teeth 267.

With reference to FIG. 17, when the pawl 248 is acting upon the last or forwardmost tooth 267 of the rack bar 250, a lock leyer 271, pivoted at 272 to the carriage structure and influenced by a spring 273, is just beginning to engage a detent 274 on the main frame structure, there being a lock notch 275 in the lock lever 271 for this purpose. FIG. 19 shows the detent 274 locked within the notch 275 for securing the carriage 225 in its rearmost position against the action of the strong spring 232 for approximately one-half cycle of the reciprocating rod motion. Upon the next forward stroke of the reciprocatory bar 246, a release element 276 rigidly secured to the rear end of the bar 246 will engage a diagonal face 277 of the lock lever 271 to release the carriage 255 from locking engagement with the notch 275, and the spring 232 will immediately return the carriage to its forwardmost position shown in FIGS. 4 and 15.

However, prior to reaching the condition shown in FIG. 19, wherein the carriage is locked in the rearmost position by the lock lever 271, an adjustable spring-loaded bumper pin 278 mounted upon a fixed portion of the framework at 279 will engage the rear end 280 of the guard 251, FIG. 17, and cause the guard to return automatically to the tooth-covering position shown in FIGS. 15 and 19, wherein the rollers 254 will reenter the shallow notches 252 against the tension of the spring 255. When this occurs, both of the pawls 248 and 268 are lifted by the guard 251 from active engagement with the teeth 267, and a moment later, FIG. 19, the lock lever 271 will be released from the detent 274, and the entire carriage 225 will return rapidly to its forwardmost position shown in FIGS. 4 and 15. When the carriage is thus returned to its forwardmost position, the same mode of operation described above and illustrated in FIGS. 15–20 is continued and the carriage 225 will again be shifted step by-step rearwardly upon the guide bars 228 to shift the plant stalks 100 from the spear 162 onto the lath 216, until the latter is loaded with tobacco plants in equi-distantly spaced relation, corresponding to the number in spacing of the pusher elements 236. Each time the carriage 225 returns to its forwardmost position under influence of the spring 232, the spring-loaded pusher elements 236 merely trip over and pass the stalks 100 which are now impaled on the lath 216. The forwardmost element 236 is likewise tripped or pushed aside against the spring 238 whenever a stalk 100 is being forced toward the trigger 258 by the rearmost moving forked finger 160 of conveyor chain 159.

Operation

As should now be apparent, the harvester travels down the row of tobacco plants under its own power in the manner shown generally in FIG. 1, and a single operator walks at the rear of the harvester with his hands on the curved frame bars 39 adjacent the handles 127 and 62. Automatic steering through the clutches 86 is obtained by manipulation of the handles 127 or by contact of the feeler levers 98 with off-center stalks 101 as previously fully explained.

As the stalks 100 enter the longitudinal passage between the guide rails 139 and 140, their lower leaves are folded upwardly by the coacting flared inclined shields 130 and they are engaged by the forked fingers 160 at the forwardmost part of the chain 159 and the stalks are advanced through the rotating disc knives 149, 150 and severed near and above the ground. The fingers 160 now convey the severed stalks rearwardly and their bottoms are transferred from the disc cutters to the bottom plate 161 and the stalks are impaled one after another upon the spear 162 with the aid of guide elements 148 and 143, previously described. As the stalks move progressively further onto the spear 162, the several spear supporting bars 165 are consecutively retracted from the spear, one at a time, and re-engaged therewith after passage of the stalks, as described.

When the stalks reach the point on the spear 162 adjacent the rear sprocket 157, the rearmost forked finger 160 shifts each stalk into the trigger 258, FIG. 16, and the step-by-step rearward motion of the carriage 225 begins and the stalk pusher elements 236 transfer the stalks 100 from the rear portion of the spear 162 onto and along the lath 216 in uniformly spaced relation thereon, regardless of the spacing of the plants in the row and regardless of their initial spacing on the spear 162. Each full travel of the carriage 225 advances a stalk approximately a foot on the lath by means of a pusher element and as the carriage returns and begins its backward travel anew upon the receipt of another stalk by the trigger 258, an adjacent pusher element advances the first stalk approximately a foot further along the lath while the first pusher element is advancing the newly received stalk, and so on, until the lath is filled.

When the lath 216 is loaded with stalks 100, the rearmost stalk will engage the lever extension 66, FIG. 4, and the lever 64 will release the handle 62, which drops, disengaging the clutch device 61, and stopping the forward motion of the harvester. The operator then lifts the handle 220 and swings the element 222 rearwardly and pulls the loaded lath 216 from its sockets and replaces it with an empty lath, and the clutch 61 is then returned by the operator to the effective position through the medium of the handle 62. The harvesting process then continues in the manner described, for as long as desired.

Modification

FIGS. 21–25 show a modified construction of the retractible support bar mechanism of my invention. In this modified form the retractible support bar 165″ is pivoted at 296 to the horizontal support plate 199 at such an elevation as to engage the spear slot 167 when pivoted into loading position as shown in dotted lines in FIG. 22. A retractile spring 297 is secured to the outer portion of support bar 165″ and serves to normally hold the support bar in the retracted position as shown in full lines in FIG. 22. The outer end of support bar 165″ carries a depression indicated at 298 for contact with the eccentric roller 187 carried by disc 170.

The trigger element 191 and associated parts operate in the same manner, as previously described in the preferred form of the retractible support bar mechanism, to move the reciprocatory slide bar 197′ to its active and inactive positions as previously described in referring to slide bar 197 in the preferred form of my invention. Slide bar 197′ carries upstanding member 200′ which supports cam extension 201 and upstanding extension 214 carrying cam face 215. The slide bar contains a longitudinally extending slot 299 therein for engagement with shaft 168′ to provide guidance for the bar in conjunction with guide blocks 198.

The upstanding shaft 168′ is rigidly supported to the base plate 199 by means of a rigid coupling through hub 300. Shaft 168′ carries a shoulder portion indicated at 301 for rotatably supporting disc 170 through bushing means 302 carried by the disc 170. Thus the disc 170 and its bushing 302 are free to rotate on shaft 168′.

Hub 303 carrying bushings 304 and 305 is disposed on shaft 168′, as shown in FIG. 24, such that the hub 303 and the assemblies carried thereby are free to rotate with respect to shaft 168′ and disc bushing 302. Plate 306 carrying flange 307 thereon, similar to flange 205 in the preferred form of the invention, is rigidly secured to the end of hub 303 for rotation therewith. Depending flange 307 carries fixed abutment elements 206′ similar to those previously described for abutment with the projection 204 on lug 202 carried by disc 170 in the same manner as described in the preferred form of the invention. Spacer member 308, sprocket wheel 309, and spacer member 310 are disposed on hub 303 so as to have a slip-fit therewith. The circumferences of spacer members 308 and 310 are recessed with respect to the circumference of sprocket wheel 309 to provide clearance for the gearing 180, such as a drive chain, coupled therewith. The upper end of hub 303 is threaded as indicated at 311 to receive the threaded clamp plate 312 carrying set screw 313. Spacer member 310 is constructed of a friction material, such as leather, and clamp plate 312 is tightened on hub 303 to apply pressure to the end faces of sprocket 309 through member 310 to provide the proper amount of friction between the sprocket wheel 309 and the hub 303 for driving the plate 306 carrying abutment elements 206′. In fact, this construction forms a clutch assembly with adjustment provided by clamp plate 312 and set screw 313. Hub 303 carries thrust plate 314 to allow for proper clearance between disc 170 and depending flange 307.

As previously described, disc 170 carries lug element 202 and eccentric roller 187. In the normally engaged position, sprocket 309 is continuously rotating, lug 202 is depressed by cam extension 201, such that projection 204 clears the rotating abutments 206, and roller 186 is engaged in depression 298 of support bar 165″ to maintain the bar in the engaged position as shown in dotted lines in FIG. 22. When trigger 191 is actuated, lug 202 is urged outwardly, in the manner previously described, and disc 170 rotates with sprocket wheel 309 through the abutment coupling of projection 204 in abutment 206′. As disc 170 rotates, coupler 187 releases the end of support bar 165″ allowing the bar to pivot to the position shown in full lines in FIG. 22, under force applied by retractile spring 297. In the disengaged position support bar 165" comes to rest against stop member 315. As disc 170 continues to rotate lug 202 engages cam face 215 in the same manner as previously described to temporarily cease rotation of disc 170, and then after trigger 191 is released disc 170 is again allowed to rotate and roller 187 contacting the side end portion of support bar 165" pivots the bar back into the engaged position as shown in dotted lines. When the support bar is pivoted to the engaged position element 202 is contacted by cam extension 201 in the same manner as previously described to cease rotation of disc 170.

Support bar 165" is locked in the engaged position by the contact of lug 202 with stop extension 208 of cam element 201, and contact of roller 187 in support bar depression 298. This depression helps to prevent override of the roller 187 and prevents the roller from becoming dislodged due to vibration of the machine.

The construction and mode of operation of all of the spear-supporting bars 165" is the same as shown and described in connection with the one unit illustrated in detail in FIGS. 22–25. The sprockets 309 of the unit are driven by the common gearing 180 in the same manner as described in the preferred form of my invention.

While I have described my invention in certain preferred embodiments, I understand that modifications may be made and I desire that it be understood that no limitations upon my invention are intended other than may be imposed by the scope of the appended claims.

Having thus described my invention, I claim:

1. A harvester for standing tobacco plants in a row comprising a self-propelled wheeled support having a longitudinal passage to receive the main stalks of the tobacco plants as the harvester traverses the row, cutter means carried by said support near the forward end thereof adjacent said passage to sever the main stalks above the ground, an elongated spear disposed within said passage rearwardly of the cutter means for piercing the main stalks after they are severed, conveyer means mounted upon the support adjacent the cutter means and spear and engageable with the main stalks to transfer the same from the cutter means onto the spear and rearwardly along the spear, retractable supporting means for the spear arranged at spaced intervals along the spear and operable in response to the passage of the main stalks through said longitudinal passage and re-engaging and supporting the spear when the stalks move beyond the retractable supporting means, and automatic steering means for the self-propelled wheeled support to automatically steer the same in the direction of main stalks which are misaligned in the row and including feeler elements engageable with the misaligned stalks to set the automatic steering means into operation.

2. A harvester for tobacco plants growing in a row comprising a wheeled support having a longitudinal passage to receive the main stalks of the tobacco plants as the harvester traverses the row, cutter means carried by the support near its forward end adjacent said passage to sever the main stalks near the ground, a spear disposed adjacent said passage and lengthwise thereof rearwardly of the cutter means to impale the main stalks after they are severed, conveyer means carried by the support near the cutter means and spear and engageable with the main stalks to transfer the same from the cutter means onto the spear and rearwardly along the spear, retractable means to support the spear at a plurality of points along its length and being in the path of travel of the main stalks, trigger controlled movable means connected with the retractable means to retract the same from supporting engagement with the spear and to re-engage the retractable means with the spear after passage of the main stalks beyond the retractable means and trigger controlled means, the trigger controlled means being operable in response to engagement with the main stalks passing along the spear, a storage lath to receive the impaled main stalks from the spear and extending rearwardly of the spear in alignment therewith and connected with said support, and reciprocatory carriage means having a plurality of spaced pusher elements engageable with the main stalks to shift the same step-by-step from the spear onto the lath and step-by-step along said lath and to position the main stalks in substantially equidistantly spaced relation upon the lath, and said carriage being slidable on said support and relative to said lath.

3. The invention as defined by claim 2, and a bottom plate connected with said support adjacent the longitudinal passage and extending lengthwise of the passage and adapted to engage and support the bottoms of the severed main stalks.

4. The invention as defined by claim 2, and ground engaging skid means mounted upon said support near the forward end thereof and depending therefrom and disposed upon opposite sides of said passage and near the cutter means for supporting the forward weight of said support and for normally sliding over the surface of the ground as the machine moves forward.

5. A tobacco plant harvester comprising a main frame having a lower longitudinal passage to receive the main stalks of standing tobacco plants in a row, a pair of ground wheels journaled upon opposite sides of the main frame near the longitudinal center thereof, a prime mover mounted upon the main frame near the longitudinal center thereof, driving connecting means between the prime mover and ground wheels and including a pair of steering clutches, feeler elements mounted upon the forward end of the main frame on opposite sides of the longitudinal passage and adapted to engage and detect the main stalks of misaligned tobacco plants in the row, linkage means connected with said feeler elements and with the steering clutches to selectively render the clutches inactive upon contact of the feeler elements with said misaligned main stalks to thereby automatically steer the harvester toward the misaligned main stalks so that they may enter the longitudinal passage, a pair of rotary disc knives mounted for rotation near the forward end of the main frame and rearwardly of the feeler elements and having overlapping peripheral portions adjacent the longitudinal passage, gearing interconnecting said disc knives and prime mover for driving the disc knives in unison to sever the main stalks close to the ground, a spear arranged adjacent the longitudinal passage rearwardly of the disc knives and adapted to pierce the severed main stalks in succession, means to support the spear upon the main frame, and conveyer means driven by the prime mover adapted to transfer the main stalks in succession from the region of the disc knives to the spear and along the spear rearwardly.

6. The invention as defined by claim 5, and a removable elongated storage lath extending rearwardly of the spear adjacent said longitudinal passage intermediate said spear and main frame and adapted to receive and support the main stalks impaled on the spear, and reciprocatory step-by-step carriage means mounted upon the main frame and operated by the prime mover and having a plurality of spaced pusher elements adapted to transfer the impaled stalks from the spear to the lath and along the lath in substantially equidistantly spaced relation.

7. A harvester for tobacco plants growing in a row and having main stalks, said harvester comprising a wheeled frame to traverse the row and having a longitudinal passage to receive the main stalks in succession, power-operated means to propel the wheeled frame along the row, movable cutter means mounted upon the forward portion of said frame to sever the main stalks near the ground and driven by said power-operated means, an elongated spear mounted upon said wheeled frame longitudinally of said passage and rearwardly of the cutter means to impale the main stalks after they are severed by the cutter means, conveyer means driven by the power-operated means to transfer the severed main stalks onto the spear and along said spear and passage, stationary support means on said frame below the spear and adjacent said passage and extending the length thereof to engage the lower ends of the severed main stalks, a normally stationary removable storage lath for the impaled main stalks supported rearwardly of and intermediate said spear and said frame and aligned therewith and forming a continuation of the spear adjacent said passage, a reciprocatory carriage slidable upon the main frame and relative to and near said lath, resilient means urging said carriage in a forward direction, a rack bar secured to said carriage, a reciprocatory pawl engageable with the rack bar to advance the carriage rearwardly in a step-by-step manner, a rotary element driven by the power-operated means and connected with said pawl to constantly reciprocate the same, spaced pusher elements carried by said carriage to engage the main stalks and transfer them step-by-step from the spear to the lath and move them step by step along the lath rearwardly in spaced relation, and trigger means in the path of travel of the main stalks adjacent said carriage to render said pawl active and inactive with relation to the rack bar.

8. The invention as defined by claim 7, and wherein said trigger means includes a guard shiftably connected with the rack bar and serving normally to cover the teeth of the rack bar when the trigger means is inactive and moving to a position uncovering the rack bar teeth when the trigger means is actuated by said main stalks.

9. The invention as defined by claim 7, and automatically releasable latch means on said carriage to secure the carriage to the frame at the rearmost end of its travel under influence of said pawl, and separate means to render the pawl inactive just prior to the release of said latch means for the return of said carriage.

10. A tobacco plant harvester as set forth in claim 5 in which said linkage means connected with said feeler elements and with the steering clutches include movable conical members for rendering the clutches active and inactive.

11. A tobacco plant harvester as set forth in claim 5 in which said steering clutches each comprises an outer housing geared to the ground wheels, spring biased arms pivoted to said housing, a sprocket gear connected to said driving connecting means connected to the prime mover, and cam means included in said linkage means for moving said spring biased pivoted arms into and out of engagement with said sprocket gear for rendering said clutches active and inactive.

12. A harvester for standing tobacco plants in a row comprising a mobile support having a longitudinal passage to receive the main stalks of the tobacco plants as the harvester travels along the row, cutter means carried by the mobile support near its forward end and adjacent said passage to sever each main stalk near and above the ground, an elongated spear disposed within said passage rearwardly of the cutter means for piercing each main stalk after the stalk is severed, conveyer means mounted upon said support adjacent the cutter means and said spear and having spaced elements engageable with each main stalk to move the same from the cutter means onto the spear and rearwardly along the spear, horizontally movable retractible means engaging the spear at a plurality of spaced points along the spear to intermittently support the spear, rotary means for directing the movement of said retractible means, gearing means connected for driving said rotary means, trigger means in the path of travel of each main stalk and actuated by the stalk upon engagement therewith, slide bar means carrying cam faces coupled for movement with said trigger means, and engagement means carried by said rotary means disposed for coaction with said cam faces to set the horizontally movable retractible means into motion.

13. A harvester for standing tobacco plants as set forth in claim 12 in which said horizontally movable retractible means are pivoted to swing in a horizontal plane.

14. A harvester for standing tobacco plants as set forth in claim 12 in which said horizontally movable retractible means are coupled at one end thereof to the rotary means and are disposed for oscillatory movement in the horizontal plane.

15. A harvester for standing tobacco plants as set forth in claim 12 in which said rotary means each comprises a disc member secured to a rotatable shaft, a sprocket wheel rotatably mounted on said shaft and driven by said gearing means, abutment projections carried by said sprocket wheel, said engagement means retractibly carried by said disc member, and said engagement means selectively engageable with the sprocket wheel abutment projections for rotation of said disc member with said sprocket wheel.

16. A harvester for standing tobacco plants as set forth in claim 12 in which said engagement means comprises a spring-loaded lug disposed for retraction into said rotary means upon contact with said cam faces.

17. A harvester for standing tobacco plants as set forth in claim 12 in which a pair of cam faces are carried by said slide bar means in such position that one of said cam faces is moved into the path of travel of said engagement means when the trigger means is disposed in the path of travel of the stalk and the other of said cam faces is moved into the path of travel of said engagement means when the trigger means is actuated by the stalk.

18. A harvester for standing tobacco plants as set forth in claim 12 in which said horizontally movable retractible means are movably connected to said rotary means by roller members connected to said rotary means.

References Cited in the file of this patent

UNITED STATES PATENTS

| 1,323,404 | Motter et al. | Dec. 2, 1919 |
| 2,477,068 | La Motte | July 26, 1949 |
| 2,836,950 | Anderson | June 3, 1958 |
| 2,933,875 | Meyer et al. | Apr. 26, 1960 |